United States Patent [19]

Momiyama

[11] 4,247,567
[45] Jan. 27, 1981

[54] METHOD FOR MAKING A RICE-CRACKER OR SENBEI

[75] Inventor: Denji Momiyama, Toyohashi, Japan

[73] Assignees: Yamashiro Seika Kabushiki Kaisha, Aichi; Sakata Beika Kabushiki Kaisha, Yamagata, both of Japan

[21] Appl. No.: 6,551

[22] Filed: Jan. 24, 1979

[30] Foreign Application Priority Data

Jan. 30, 1978 [JP] Japan .................................. 53-9123

[51] Int. Cl.³ ............................................ A21D 6/00
[52] U.S. Cl. .................................. 426/302; 426/104; 426/94; 426/143; 426/560
[58] Field of Search ............... 426/502, 549, 560, 615, 426/496, 499, 514, 516, 93, 302, 305, 450, 94, 438, 439, 143, 144, 296, 501, 512, 506

[56] References Cited

U.S. PATENT DOCUMENTS

| | | | |
|---|---|---|---|
| 3,311,069 | 3/1967 | Underwood | 426/502 |
| 3,937,852 | 2/1976 | Wolf | 426/549 |
| 3,982,032 | 9/1976 | Koizumi | 426/549 |
| 4,047,478 | 9/1977 | Trostmann et al. | 426/502 |

FOREIGN PATENT DOCUMENTS 2048142  3/1971  France ..................................... 426/549

Primary Examiner—Joseph M. Golian
Assistant Examiner—George C. Yeung
Attorney, Agent, or Firm—Mason, Fenwick & Lawrence

[57] ABSTRACT

This invention relates to a method for making a rice-cracker or "senbei" as it is known in Japan which has a curved shape such as cylindrical, hemispherical or petaloid unlike the usual flat rice-cracker; a planar blank of a rice-cracker is made by rolling, by punching and by drying so as to have an appropriate water content and one surface of the blank is coated with liquid seasoning including salt water; the blank is then heated with the water content of one surface being different from that of the other surface with the two surfaces being heated to different temperatures.

1 Claim, 13 Drawing Figures

METHOD FOR MAKING A RICE-CRACKER OR SENBEI

This invention relates to a method for making a sort of a rice-cracker, named "senbei" in Japan.

In usual method for making the rice-cracker or "senbei" from nonglutenous rices used as main raw material, this material made into a body of the rice-cracker or "senbei" through processes of a rice milling, water-adding, steaming, cooling, kneading and so on, the body of the rice-cracker or "senbei" is then rolled to form a thin strip of it, this strip being punched to form an individual body of the rice-cracker or "senbei" of a desired shape, and after that the individual body of the rice-cracker or "senbei" is dried so as to have a thickness of 0.2–2.0 mm and a water content of 10–22%. Thereafter the dried material of the rice-cracker or "senbei" is baked and seasoned to produce a flat plate-like product, this product has a substantially homogeneous structure in general and there is a no difference between two surfaces of this product.

This invention has an object to make a rice-cracker or "senbei" which has not a flat plate-like shape but a shape enveloping a three dimentional space such as cylindrical, hemispherical or petaloid shape unlike usual flat plate.

The present invention provides a method for making a rice-cracker or "senbei" in Japan in which a body of a rice-cracker or "senbei" is made of nonglutenous rices used as raw material, and a strip of rice-paste is made from them in ordinary manner, the strip of said body of the rice-cracker is punched to form a plate-like blanks of the rice-cracker that is a body of "senbei", said body of the rice-cracker being shaped circularly, rectangularly, stellately and so on and having a thickness of 0.2–2.0 mm and a water content of 10–22%, the body of the rice-cracker is pre-dried, only one surface of the body of the rice-cracker is coated with liquid seasoning such as salt water, soy and so on having a salt concentration of 5–20 Baumé degree for example by means of spraying in order to form a saline coating film made of said liquid seasonings on said one surface, the body of the rice-cracker is heated at 180°–300° C. under a condition that water in the saline coating film does not sufficiently permeate inwardly and therefore the water content of the coated surface is different from that of the other non-coated surface, and in said heating process the body of the rice-cracker is baked and formed into a rice-cracker or "senbei" which has a shape enveloping a space therein such as cylindrical, hemispherical, or spherical shape unlike usual flat plate-like rice-cracker, because of the difference between the inflation-degrees of the both surface.

These and other features of the invention will be apparent from the description on the embodiments shown by way of example with reference to the accompanying drawings.

Figure 1:
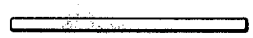
FIG. 1 is a side view of a body of a rice-cracker or "senbei"

Referring now to the embodiments shown in the drawings, FIG. 1 shows a side view of a body of the rice-cracker or a plate-like blank of the rice-cracker which blank is made by punching the body of the rice-cracker and has a water content of 11% as well as a thickness of 0.8 mm and is shaped substantially circularly. In making of said rice-cracker only one surface of the body of the body of said rice-cracker is coated with salt water having a salt content of 15 Baumé degree for example by means of spraying as aforementioned, while taking care that water in the coating salt water does not reach the other surface of the body in order to form a saline coating film only on said one surface.

Figure 2:
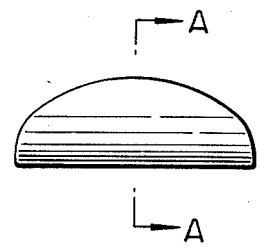
FIG. 2 is a front view of the first embodiment of a rice-cracker made according to the method of the present invention.
Figure 3:
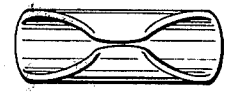
FIG. 3 is a plan of the rice-cracker shown in FIG. 2.
Figure 4:
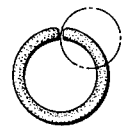
FIG. 4 is a sectional view taken along the line A—A of FIG. 2.
Figure 5:
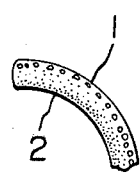
FIG. 5 is an enlarged structure view of an encircled portion in FIG. 4.
Figure 6:
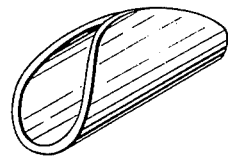
FIGS. 6 to 9 are perspective views showing various cylindrical rice-crackers.

When this coated blank of the rice-cracker is heated, it is curved cylindrically as shown in FIGS. 3, 6, 8 and 9, because the coated surface has a greater water content the heating causes the blank to curl. FIG. 4 shows a cross sectional view taken alone line A—A in FIG. 2. FIG. 5 shows an enlarged structure view of a portion of the section shown in FIG. 4, and the structure of the coated surface portion is relatively coarse.

Figure 7:
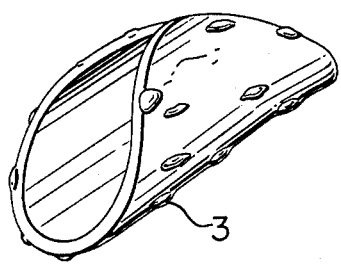
Figure 8:
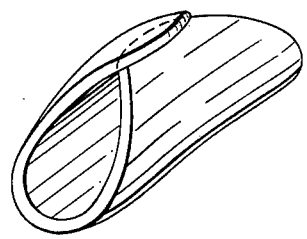
Figure 9:
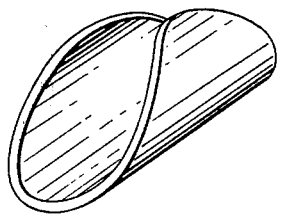
Figure 10:
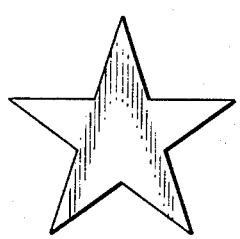
FIG. 10 is a plan of a body of a stellately shaped rice-cracker or "senbei"
Figure 11:
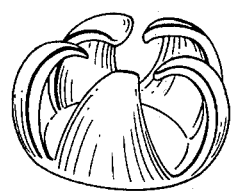
FIG. 11 is a perspective view of a rice-cracker or "senbei" made by baking of the body of the rice-cracker or "senbei" shown in FIG. 10.
Figure 12:
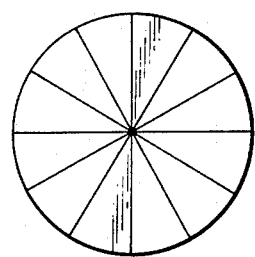
FIG. 12 is a plane of a body of a rice-cracker or "senbei" with radially extending notch lines.
Figure 13:
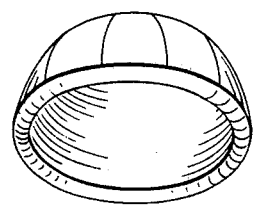
FIG. 13 is a perspective view of a hemispherically shaped body of a rice-cracker or "senbei" made by the baking of the body of the rice-cracker or "senbei" shown in FIG. 12.

If the salt content of the salt water is less than 5%, then the blank of the rice-cracker or "senbei" is curved insufficiently, because of little difference between heated temperatures of both surface. If the salt content of the salt water is more than 20%, then the subsequent seasoning process is hindered, because the coated blank of the rice-cracker is too salty. Usually the water content of the blank of the rice-cracker is 10–22%, however if such a blank is secondarily dried to decrease the water content to 4–5%, and thereafter only one surface of the blank of the rice-cracker is coated with a salt water, and this blank is heated, then a cylindrical rice-cracker or "senbei" having smooth surfaces without bulged portions 3 as shown in FIG. 7 can be obtained.

The rice-cracker or "senbei" made by the method of the present invention envelopes a space in it cylindrically, hemispherically and so on and therefore it is agreeable to the taste. It has a increased strength even if it is thinner and consequently the risk of breakage is little in handling it. The use of a salt water increases taste of the rice-cracker and therefore this rice-cracker or "senbei" can be eaten comfortably.

What I claim is:

1. A method of making a non-planar rice cracker comprising the steps of providing a thin plate-like planar blank of conventional rice paste having a thickness in the range of 0.2 mm to 2.0 mm and a water content of at least 4%, applying a coating of salt water having a salt content of not less than 5% or more than 20% to one surface of said planar blank of rice paste to form a saline coating film and baking said planar blank of rice paste under a condition so that the water in the saline coating film does not substantially permeate inwardly so that the water content of the coated surface is different from that of the other non-coated surface to effect a curling of the planar blank into a curved shape.

* * * * *